United States Patent [19]

Devine, Jr.

[11] E Re. 31,568

[45] Reissued Apr. 24, 1984

[54] COMPOSITE SUBSTRATE FOR ROTATING X-RAY ANODE TUBE

[75] Inventor: Thomas M. Devine, Jr., Scotia, N.Y.

[73] Assignee: General Electric Company, Schenectady, N.Y.

[21] Appl. No.: 365,079

[22] Filed: Apr. 5, 1982

Related U.S. Patent Documents

Reissue of:

[64] Patent No.: 4,145,632
Issued: Mar. 20, 1979
Appl. No.: 788,245
Filed: Apr. 18, 1977

[51] Int. Cl.[3] ..... H01J 35/08

[52] U.S. Cl. ..... 378/125; 378/143; 378/144

[58] Field of Search ..... 378/143, 144, 125

[56] References Cited

U.S. PATENT DOCUMENTS

| | | | |
|---|---|---|---|
| 3,122,424 | 2/1964 | King | 29/195 |
| 3,579,022 | 5/1971 | Hennig | 313/330 |
| 3,649,355 | 3/1972 | Hennig | 313/330 |
| 3,660,053 | 5/1972 | Palme | 29/195 |
| 3,710,170 | 9/1973 | Friedel | 313/330 |
| 3,719,854 | 3/1973 | Sedlatschek et al. | 313/330 |
| 3,890,521 | 6/1975 | Shroff | 313/55 |

FOREIGN PATENT DOCUMENTS

| | | | |
|---|---|---|---|
| 7112589 | 6/1972 | Fed. Rep. of Germany | 313/330 |

*Primary Examiner*—Saxfield Chatmon, Jr.
*Attorney, Agent, or Firm*—Leo I. MaLossi; James C. Davis, Jr.; James Magee, Jr.

[57] ABSTRACT

A composite substrate for use in a rotating x-ray anode tube consists of a graphite member joined to another member to which a target anode is affixed.

6 Claims, 1 Drawing Figure

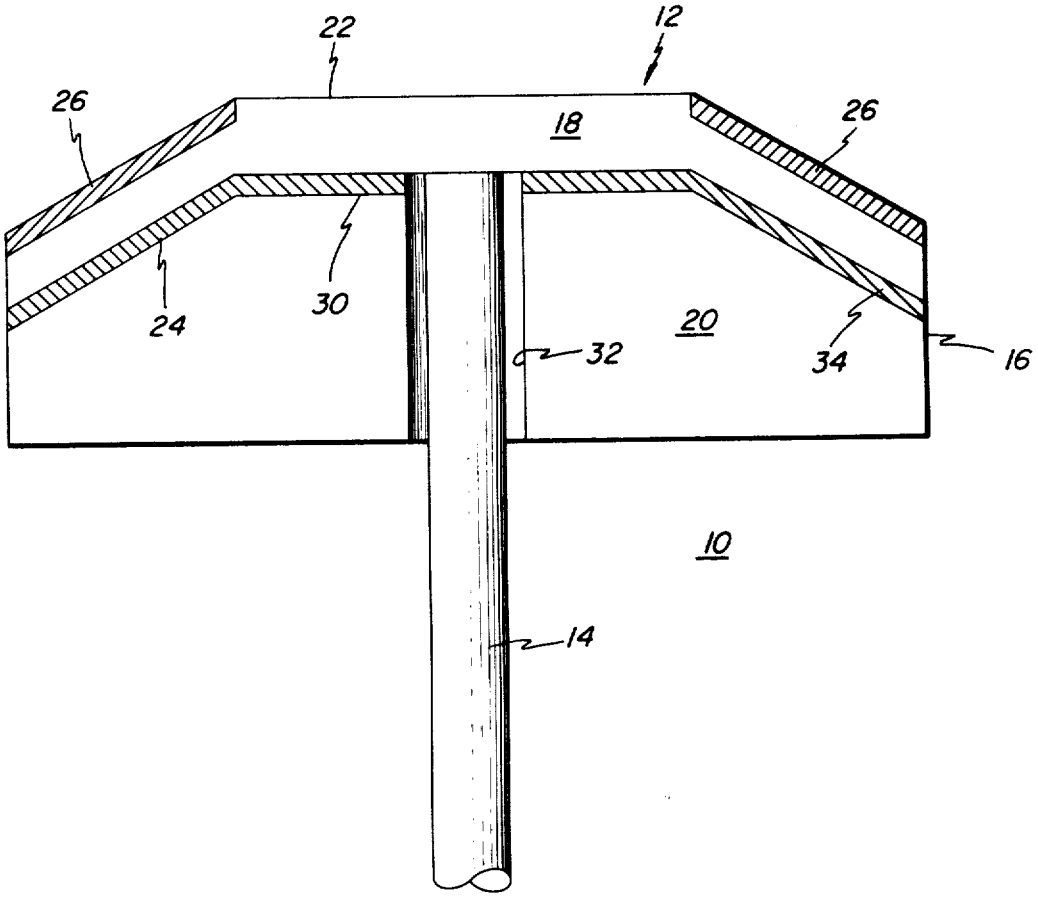
22
12
26
18
26
24
30
20
32
34
16
10
14

COMPOSITE SUBSTRATE FOR ROTATING X-RAY ANODE TUBE

Matter enclosed in heavy brackets [ ] appears in the original patent but forms no part of this reissue specification; matter printed in italics indicates the additions made by reissue.

*This invention is related to U.S. 4,073,426- Devine, Jr. upon copending reissue application S.N. 365,080, filed April 5, 1982 is based and U.S. 4,119,879- Devine, Jr. upon which copending reissue application S.N. 365,078, filed April 5, 1982 is based.*

BACKGROUND OF THE INVENTION

1. Field of the Invention

This invention relates generally to an anode assembly for rotating x-ray anode tubes, and in particular to a composite substrate comprising a graphite member.

2. Description of the Prior Art

The longevity and efficiency of rotating x-ray anode tubes can be increased by using anode discs capable of high heat storing and high heat dissipating properties. Graphite possesses an exceptionally high thermal capacity when compared to molybdenum and tungsten, other materials used for making the substrate of the disc. At 1000° C., the ratio of thermal capacity, in relative units, and in the order mentioned heretofore, is 48:7.4 and 48:4.1. The ratio of emissivity at 1000° C. is 0.85:0.15 in both instances. However, the difficulty in using graphite as a substrate material is the problem of how to join the anode target to the graphite substrate.

Prior art anode assemblies embodying a graphite substrate suggest the use of zirconium or hafnium as a suitable material for joining the anode target to the graphite substrate. However, both of these materials are carbide formers and present the problem of how to minimize the amount of carbide formed during the joining operation, as well as during the desired working lifetime of the anode assembly, usually 10,000 x-ray exposures, minimum. The working lifetime subjects the anode assembly temperature to being cycled to reasonably high levels, the order of 1200° C., and, therefore, continued carbide formation is a distinct possibility. The mechanical properties of a carbide layer formed in such an anode assembly may preclude the use of such an anode assembly in rotating x-ray anode tubes subjected to large amplitude thermal cycling.

An object of this invention is to provde a new and improved anode disc embodying a substrate comprising graphite for use in rotating x-ray anode tubes.

Another object of this invention is to provide a new and improved substrate for an anode disc which is a composite assembly including a graphite member.

Other objects of this invention will, in part, be obvious and will, in part, appear hereinafter.

In accordance with the teachings of this invention, there is provided a composite substrate suitable for use in rotating x-ray anode tubes. The composite substrate includes a first member to which an anode target may be affixed. This first member may be of tungsten, a tungsten alloy, molybdenum or a molybdenum alloy.

Affixed to the first member is a second member made of graphite. A layer of metal which includes a non-carbide forming material joins the two members together to form the composite substrate. Suitable non-carbide forming materials for use in the metal layer are platinum, palladium, rhodium, osmium and ruthenium. When the metal is platinum, up to 1% by weight by chromium may be included therein even though it is known to aid the formation of carbides.

DESCRIPTION OF THE INVENTION

Referring now to the Figure, there is shown an anode assembly 10 suitable for use in a rotating x-ray anode tube. The anode assembly 10 includes a disc 12 joined to a stem 14 by suitable means such, for example, as by brazing, welding and the like. The disc 12 comprises a composite substrate 16 of a first member 18 bonded to second member 20 of graphite.

The first member 18 has a saucer-like configuration and two opposed major surfaces 22 and 24 which are, respectively, the outer and inner surfaces thereof. The first member 18 comprises a central portion and an integral outer portion. An anode target 26 is affixed to a selected surface area of the outer surface 22 of the integral outer portion of the first member 18. Preferably, the material comprising the first member 18 is either tungsten, molybdenum or suitable alloys thereof. The material of the anode target may comprise tungsten, an alloy of [tunsgten] *tungsten* and rhenium, and the like. When the material of the anode target 26 is an alloy of tungsten and rhenium, the rhenium content may vary up to about 25 weight percent but is typically from 3 to 10 weight percent.

The second member 20 is made of graphite which is an economical form of carbon and suitable for reliable manufacturing processing for forming the member 20. The graphite enables the disc 12 and the assembly 10 to have the desireable features of high heat storing and high heat dissipating properties. The member 20 has a surface area 30 which is contoured to approximate the inner surface 22 of the member 18. A wall 32 defines an aperture which extends entirely through the member 30.

The first member 18 and the anode target 26 may each be made separately and then joined to each other by use of a suitable braze material. Alternately, a powered metallurgical technique is employed to form the anode target 26 and the member 18 as a unitary unit. A predetermined amount of the powder metal material to make the anode target 26 is placed in a die. The molybdenum or tungsten powder metal is then added to the die. The powder metals are then compressed to form a green compact of the anode target 26 integral with the first member 18. The green compact is then sintered and hot forged to produce the target 26 bonded to the member 18.

Thereafter, the stem 14 is joined to the first member 18 by such suitable means as inertia welding, brazing and the like. A suitable material for making the stem 14 may be columbium (Cb), Cb291, Cb103 and Cb-1Zr. Preferably, the stem 14 has an interior wall surface (not shown) which defines an interior chamber and aids in the minimizing of transfer energy to other components via the stem 14.

The member 20 is disposed on the member 18 in a manner whereby the respective surfaces 30 and 22 are opposed to each other and separated therefrom by a layer of metal 34. The stem 14 extends entirely through the passageway defined by the wall 32 of the member 20. The wall 32 is spaced from the stem 14 to prevent the formation of carbides in the metal of stem 14 which could possibly cause a premature end of its working life.

The material of the metal layer 34 is one that is not a carbide former. This is of particular interest when the member 18 comprises tungsten or molybdenum. Further, there should be [not] *no* solubility of carbon in the material of the metal layer 34 in the range of operating temperatures which can range as high as about 1300° C. Partial solubility of carbon in the material of the metal layer 34 is permissible at much higher temperatures, that is to say, at the temperature of joining the member 18 to the member 20, a solubility of carbon of from 1 to 4 atomic percent in the material of the metal layer 34 is tolerable. The material should have some solubility in tungsten and the tungsten alloy of the member 18. *Although the brazed regions that develop above and below layer 34 are not shown in FIG. 1, the above solubility criteria assure that, under the proper processing conditions, the metal provided to yield layer 34 as the barrier to carbon diffusion will melt and alloy with (i.e. be brazed to) the metal of member 18 over the surface thereof contacting member 18 and will melt and alloy with (i.e. be brazed to) carbon over the surface of graphite substrate 20 wet thereby.*

Suitable materials for comprising the metal layer 34 are platinum, palladium, rhodium, osmium and ruthenium. All of these materials are non-carbide formers. In addition each of the materials is soluble in tungsten and molybdenum alloys thereof of the member 18 and has a low solubility for carbon. In particular, the solubility for carbon is practically zero at the maximum bulk operating temperature (about 1300° C.) of a rotating x-ray anode tube embodying the anode assembly 10. Platinum, palladium, rhodium, osmium and ruthenium all form a simple eutectic system with carbon. For commerical applications, however, platinum and palladium are the only practical materials to be used in the metal alloy 26. Rhodium, osmium, and ruthenium, although they each have a higher brazing temperature than platinum and palladium, are too expensive at this time so as to be employed as the principle material in the metal layer 26.

Palladium is suitable for the material of the metal layer 34 as it has a minimum joining or carbon-palladium eutectic temperature of 1504° C. and nearly zero solubility for carbon at temperatures less than 1300° C. Excellent bonds are achieved between the member 18 and the member 20. However, the maximum bulk operating temperature of the anode assembly 10 is about 1300° C., allowing only a 200° C. margin of safety. Therefore, the reliability of the anode assembly 10 is less than that when platinum comprises the material of the metal layer 26.

The preferred material at this time for comprising the material of the metal layer 34 is platinum. The temperature of joining the member 18 to the graphite member 20 is about 1800° C. The minimum joining temperature, or carbon-platinum eutectic temperature is 1705° C. This provides a greater safety margin for the anode tube operation that is 400° C. Below about 1500° C., the platinum metal layer 34 has zero solubility for carbon. Therefore, the platinum metal layer 26 provides an excellent barrier against carbon diffusion into the member 20 even at the upper limit of the operating temperature range of about 1300° C.

Alloys of platinum may also be used. However, one must not employ large concentrations of elements therein which when alloyed may cause carbide formation at the joining temperature or excessive carbon diffusion in the tube operating temperature range. Although chromium is a carbide former, platinum with up to 1% by weight can be employed as the metal layer 34.

Several methods may be employed to provide the platinum or platinum alloy metal layer 34. One may plate onto the graphite. Preferably an electroplating process is employed. A thickness of from ¼ mil to about 1 mil is preferred. Alternately, the platinum may be sputtered onto the graphite. The platinum deposition is followed by heat treating the electroplated graphite at about 1200° C.±20° C. for a period of about 3 hours in vacuum to degass the plated graphite.

The metal layer 34 may also be provided by employing platinum or a platinum-chromium alloy in a foil form. The thickness of the foil depends solely on the need to assure one of a good bond or joint. The foil has a thickness of at least one-half mil. Should the foil thickness be less than one-half mil, an incomplete bond may result because of the lack of intimate contact between the member 18 and the graphite member 20 due to the irregularities on the surfaces of each. Preferably the foil has a thickness of 1 mil in order to assure one of having a reliable joint formed by the metal layer 34.

The anode assembly 10 may be fabricated in several ways. In one instance the processed member 18, including the target anode 26 is disposed on the plated graphite member 20 and joined together at an elevated temperature of about 1800° C. In a second instance, a sandwich of a graphite member 20, a foil of platinum or a platinum-chromium alloy and the member 18 is assembled and joined together at about 1800° C.

A preferred method of joining the member 18 to the graphite member 20 includes the assembling, in a sandwich configuration, of a platinum plated graphite member 20, a foil member and the member 18. The foil member is disposed on the plated surface of the graphite member 20. The member 18 is the disposed on the foil member. The components of the "sandwich" are held together in a suitable manner so that the surfaces to be joined together are in a close abutting contact relationship with each other.

The assembled components are placed in a controlled atmosphere furnace. The preferred atmosphere is hydrogen. The hydrogen aids the platinum wetting of the surfaces to be joined together. In addition, the hydrogen atmosphere acts as a reducing agent for any oxide present on the surface of the components to be joined together.

The assembled components are initially placed in the coolest portion of a hydrogen tube furnace and preheated for a period of time up to about 30 minutes to acclimatize the component. A minimum of 10 minutes is desired. Upon completion of preheating, the assembled components are moved into a portion of the furnace where the temperature is about 1800° C.±30° C. The assembled components are retained in this portion of the furnace for a period of time sufficient to join the components together by brazing by formation of the layer of metal 34. A period of time up to 10 minutes has found to be sufficient, with about 3 minutes being preferred. Upon completion of the brazing step, the assembly 10 is moved to a "cool down zone" in the tube furance where it remains for a sufficient time to cool the components and solidify the melt to form the metal layer 34. A time of approximately 1 hour has been found sufficient to cool the disc sufficiently from a temperature of about 1000° C. in the "cool down zone" for removal from the furnace.

To illustrate the soundness of the bond between tungsten and graphite, a layer of platinum, 1 mil in thickness, was disposed on a surface of a block of graphite, 1 inch in thickness, by electrodeposition means. The plated substrate was degassed at 1200° C.±20° C. for a period of 3 hours. A tungsten member was prepared and one surface metallographically polished to 600 grit paper. A preform, 1 mil in thickness, was prepared from a foil sheet of platinum.

A sandwich was then assembled. The platinum preform was disposed on the platinum plated surface of the graphite block. The tungsten member was placed on the preform with the polished surface in an abutting contact relationship with the preform. The assembled components were bound tightly together, disposed in a molybdenum boat and placed in the coolest end of a hydrogen tube furnace. The assembled components were allowed to acclimatize for 10 minutes then moved into the hottest portion of the tube furnace. The temperature was measured by an optical pyrometer and found to be 1800° C.±30° C. The assembled components remained in the hot zone for three minutes to braze the components together. The assembled components were then moved to a cooler zone in the furnace, 1000° C.±20° C. and allowed to furnace cool from that temperature for 45 minutes before removing them from the furnace.

Upon removal from the furnace the brazed components were examined visually. The braze joint appeared sound. The brazed assembly of components was then sectioned and the tungsten-platinum-carbon interface examined. The braze joint was sound throughout. Various section were then subjected to bending loads until fracture occurred. All fractures occurred either in the tungsten anode target or in the graphite substrate but never in the platinum-tungsten or the platinum-grapite interfaces.

The new disc assembly enables one to employ radiographic techniques which require higher power outputs for either short or long durations without the fear of premature failure during use than what could be employed by the prior art assemblies. The capability of being able to withstand higher power outputs enables one to expose patients for a shorter time during x-raying procedures.

I claim as my invention:

1. A composite substrate *for an anode target* for use in a rotating x-ray anode tube comprising a first member *having a saucer-like configuration and being adapted to receive an anode target on the protruding surface thereof, the material of said first member being selected from the group consisting of tungsten, an alloy of tungsten, molybdenum and an alloy of molybdenum,* a second member [comprising] *having surface configuration contoured to match the recessed surface of said first member, the material of said second member being* graphite, and

[a layer of metal consisting essentially of a non-carbide forming material joining the first member to the second member,]

[the metal is a material in which the solubility of carbon therein is practically zero up to a temperature of about 1300° C. but in which from 1 to 4 atomic weight percent of carbon is soluble therein at the temperature of joining the first member to the second member, and]

[the metal is soluble in the material of the first member.]

*a metallic layer extending between and joining said first and second members; said metallic layer consisting of a barrier metal lamina flanked on opposite sides by first and second brazed regions; the metal constituting said barrier metal lamina providing an effective barrier against carbon diffusion and being selected from the group consisting of rhodium, osmium, ruthenium, palladium, platinum and an alloy of platinum and chromium; said first and second brazed regions consisting of alloys formed with the metal selected for said barrier metal lamina; said first brazed region, in which the metal selected for said barrier metal lamina has reacted with carbon, extending between one side of said barrier metal lamina and said second member, and*

*said metallic layer having a thickness of at least ¼ mil.*

[2. The composite substrate of claim 1 wherein the non-carbide forming material is one selected from the group consisting of platinum, palladium, rhodium, osmium and ruthenium.]

[3. The composite substrate of claim 1 wherein the material of the first member is one selected from the group consisting of tungsten, an alloy of tungsten, molybdenum and an alloy of molybdenum.]

[4. The composite substrate of claim 3 wherein the non-carbide forming material is one selected from the group consisting of platinum, palladium, rhodium, osmium and ruthenium.]

5. The composite substrate of claim [4] *1* wherein the material of the first member is tungsten, and the [non-carbide forming material] *metal of the barrier metal lamina* is platinum.

6. The composite substrate of claim [2 wherein the non-carbide forming material is platinum to which up to 1 percent by weight of chromium has been added] *1 wherein the metal of the barrier metal lamina is an alloy of platinum and chromium in which the maximum chromium content is 1 percent by weight.*

7. An anode assembly for rotating x-ray anode tubes including

[a disc including] a composite substrate[, the composite substrate] comprising a first member having [two opposed major surface] *a saucer-like configuration* and a second member [consisting of] *having surface configuration contoured to match the recessed surface of said first member, the material of said second member being* graphite, a wall defining a centrally disposed aperture extending entirely through [the] *said* second member, an anode target affixed to a selected surface area of [one of the two opposed major surfaces] *the protruding surface* of [the] *said* first member, *said first member being of a material selected from the group consisting of tungsten, an alloy of tungsten, molybdenum and an alloy of molybdenum,*

[a layer of metal consisting essentially of a non-carbide forming material joining the second member to the second opposed major surface of the first member, the metal is a material in which the solubility of carbon therein is practically zero up to a temperature of about 1300° C. but in which from 1 to 4 atomic weight percent of carbon is soluble therein at the temperature of joining the first member to the second member, and the metal is soluble in the material of the first member, and]

*a metallic layer extending between and joining said first and second members; said metallic layer consisting of a barrier metal lamina flanked on opposite sides by*

*first and second brazed regions; the metal constituting said barrier metal lamina providing an effective barrier against carbon diffusion and being selected from the group consisting of rhodium, osmium, ruthenium, palladium, platinum and an alloy of platinum and chromium; said first and second brazed regions consising of alloys formed with the metal selected for said barrier metal lamina; said first brazed region, in which the metal selected for said barrier metal lamina has reacted with carbon, extending between one side of said barrier metal lamina and said second member, and*

*said metallic layer having a thickness of at least ¼ mil, and* a stem [affixed to a centrally located surface area of the second major surface of the first member and extending entirely through the aperture of the second member] *extending through said aperture, affixed to centrally located surface area of said first member* and [being] spaced [apart] from [the] *said* wall defining [the] *said* aperture.

[8. The composite substrate of claim 7 wherein the non-carbide forming material is one selected from the group consisting of platinum, palladium, rhodium, osmium and ruthenium.]

[9. The composite substrate of claim 7 wherein the material of the first member is one selected from the group consisting of tungsten, an alloy of tungsten, molybdenum and an alloy of molybdenum.]

[10. The composite substrate of claim 9 wherein the non-carbide forming material is one selected from the group consisting of platinum, palladium, rhodium, osmium and ruthenium.]

11. The [composite substrate of claim 10] *anode assembly of claim 1* wherein the material of the first member is tungsten, and the [non-carbide forming material] *metal of the barrier metal lamina* is platinum.

12. The [composite substrate of claim 8 wherein the non-carbide forming material is platinum to] *anode assembly of claim 7 wherein the metal of the barrier metal lamina is an alloy of platinum and chromium in* which up to 1 percent by weight of chromium has been added *to platinum.*

* * * * *